United States Patent
Shin et al.

(10) Patent No.: US 8,682,110 B2
(45) Date of Patent: Mar. 25, 2014

(54) METHOD AND APPARATUS FOR CONVERTING RESOLUTION OF BLOCK BASED IMAGE

(75) Inventors: Gun-shik Shin, Suwon-si (KR); Se-hyeok Park, Seoul (KR); Jong-hyun Park, Seoul (KR); Chang-su Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/491,114

(22) Filed: Jun. 7, 2012

(65) Prior Publication Data

US 2012/0314975 A1 Dec. 13, 2012

(30) Foreign Application Priority Data

Jun. 7, 2011 (KR) .................. 10-2011-0054644

(51) Int. Cl.
*G06K 9/32* (2006.01)

(52) U.S. Cl.
USPC ............................ 382/299; 362/236; 362/238

(58) Field of Classification Search
USPC ............ 382/232, 236, 238, 299; 348/699; 375/240.01, 240.16, 240.24, E7.0081
See application file for complete search history.

(56) References Cited

U.S. PATENT DOCUMENTS

| | | | | |
|---|---|---|---|---|
| 6,018,368 A | * | 1/2000 | Kim et al. ................. | 375/240.24 |
| 6,690,724 B1 | * | 2/2004 | Kadono .................... | 375/240.01 |
| 8,249,370 B2 | * | 8/2012 | Kanamori et al. ........... | 382/232 |

FOREIGN PATENT DOCUMENTS

KR  10-0985464 B1  9/2010

OTHER PUBLICATIONS

Zhang, Zhi et al., "Robust image superresolution method to handle localized motion outliers", SPIE Optical Engineering, vol. 48, No. 7, Jul. 2009, 8 pages.
Kim, S.P. et al., "Recursive Reconstruction of High Resolution Image From Noisy Undersampled Multiframes", IEEE Trans. on Acoustics, Speech, and Signal Processing, vol. 38, No. 6, Jun. 1990, pp. 1013-1027.

* cited by examiner

*Primary Examiner* — Anh Do
(74) *Attorney, Agent, or Firm* — Sughrue Mion, PLLC

(57) ABSTRACT

A method and apparatus for converting a resolution of a block-based image. The method includes: dividing a low resolution image frame into a plurality of blocks, each block having a predetermined size; performing motion prediction in a sub-pixel unit of each of the divided blocks and determining a motion vector in the sub-pixel unit; dividing the motion vector of the sub-pixel unit into a first motion vector having an integer pixel unit and a second motion vector having the sub-pixel unit; determining at least one low resolution reference block corresponding to each of the divided blocks by using the first motion vector having the integer pixel unit; converting each of the divided blocks into high resolution block by using the second motion vector having the sub-pixel unit and the one low resolution reference block; and generating a high resolution image frame by using each of the converted high resolution blocks.

20 Claims, 7 Drawing Sheets

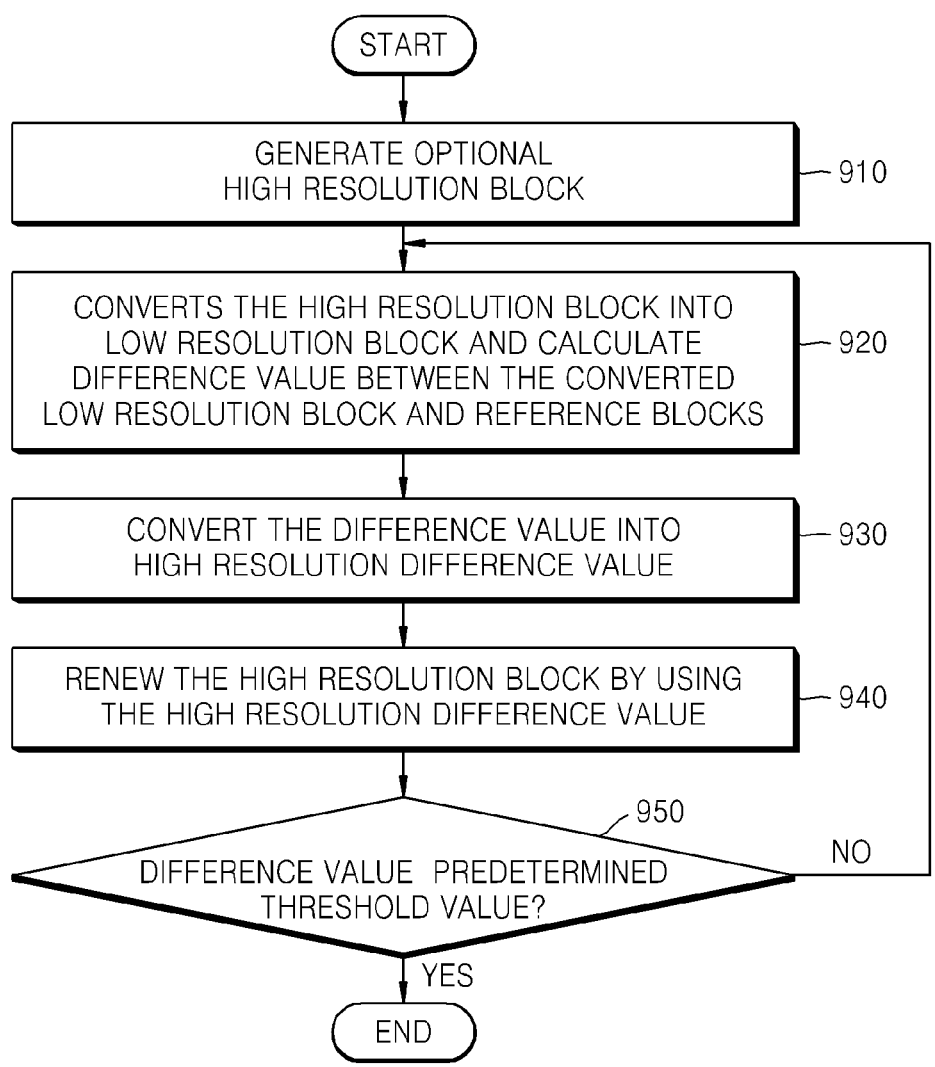

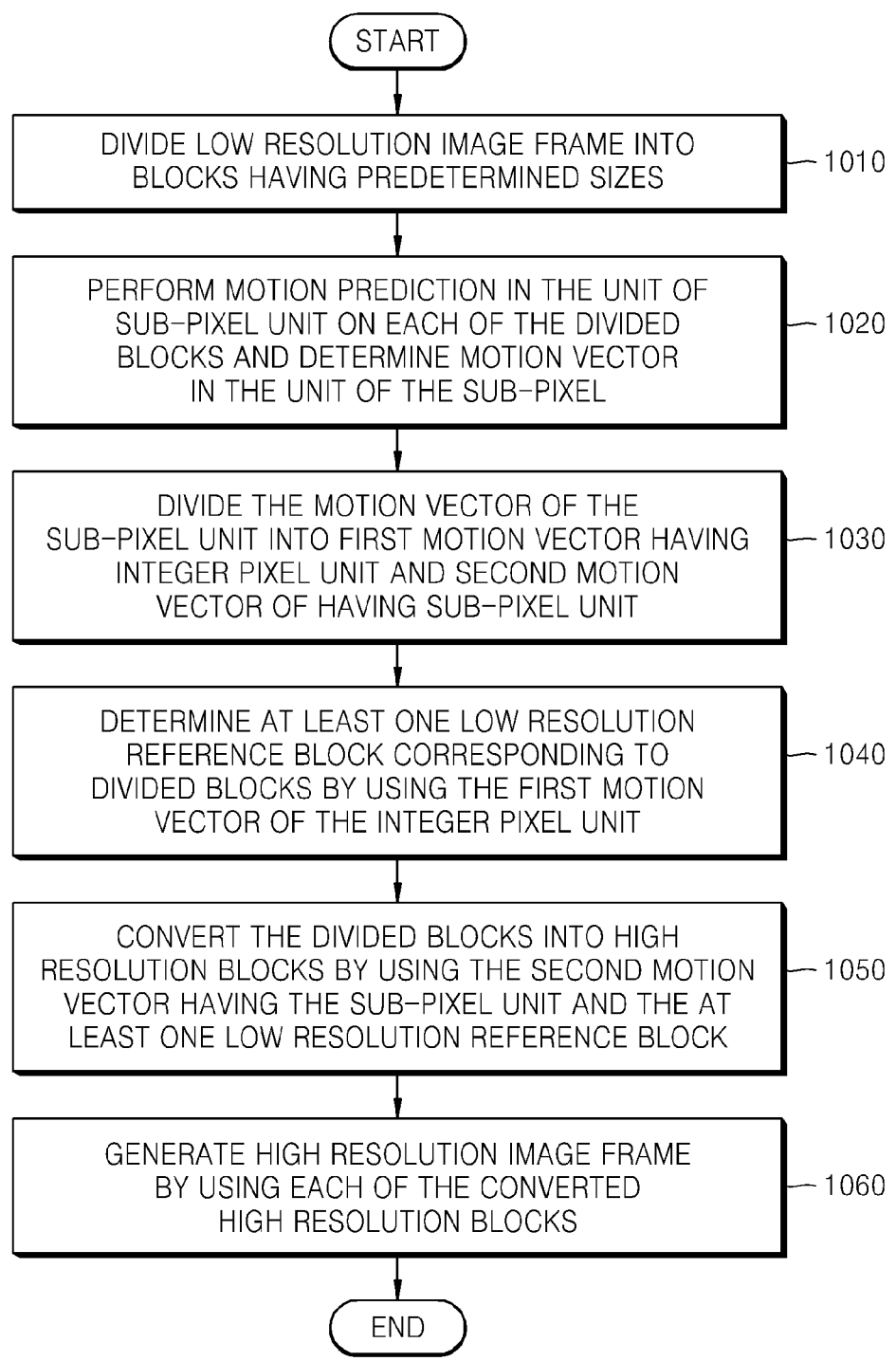

METHOD AND APPARATUS FOR CONVERTING RESOLUTION OF BLOCK BASED IMAGE

CROSS-REFERENCE TO RELATED PATENT APPLICATION

This application claims priority from Korean Patent Application No. 10-2011-0054644, filed on Jun. 7, 2011, in the Korean Intellectual Property Office, the disclosure of which is incorporated herein in its entirety by reference.

BACKGROUND

1. Field

Methods and apparatuses consistent with exemplary embodiments relate to conversion of a resolution of an image, and more particularly to, a method and apparatus for converting a resolution of a block based image by using a super resolution technique of generating a high resolution image from a low resolution image.

2. Description of the Related Art

A conventional scaler that converts a resolution of an image uses a single frame. The conventional scaler that uses the single frame performs interpolation according to pixel information included in the single frame by using a single filter or a plurality of filters. However, since such conventional scaler uses a single frame, if the number of interpolated pixels increases according to an expansion ratio, image quality deteriorates.

SUMMARY

One or more exemplary embodiments may provide a method and apparatus for converting a resolution of a block based image by generating a high resolution image from a low resolution image without access to an external memory by using block based image data.

One or more exemplary embodiments may also provide a method and apparatus for converting a low resolution image into a high resolution image without a blocking artifact by applying a block based motion prediction result to a super resolution technique.

According to an aspect of an exemplary embodiment, there is provided a method of converting a resolution of a block-based image, the method comprising: dividing a low resolution image frame into a plurality of blocks having predetermined sizes; performing motion prediction in a unit of sub-pixel on the divided block and determining a motion vector in the unit of sub-pixel; dividing the motion vector of the sub-pixel unit into a first motion vector having an integer pixel unit and a second motion vector having a sub-pixel unit; determining at least one low resolution reference block corresponding to the divided block by using the first motion vector having the integer pixel unit; converting the divided block into high resolution block by using the second motion vector having the sub-pixel unit and the at least one low resolution reference block; and generating a high resolution image frame by using each of the converted high resolution blocks.

According to another aspect of an exemplary embodiment, there is provided an apparatus for converting a resolution of a block-based image, the apparatus comprising: a motion predictor which performs motion prediction in a unit of sub-pixel on each of blocks having predetermined sizes divided from a low resolution image frame and determining a motion vector in the unit of sub-pixel; a motion vector divider which divides the motion vector in the unit of sub-pixel into a first motion vector having an integer pixel unit and a second motion vector having the sub-pixel unit; a motion compensator which determines at least one low resolution reference block corresponding to the divided block by using the first motion vector having the integer pixel unit; a high resolution convertor which converts the divided block into a high resolution block by using the second motion vector having the sub-pixel unit and the at least one low resolution reference block; and a high resolution frame generator which generates a high resolution image frame by using each of the converted high resolution blocks.

According to another aspect of an exemplary embodiment, there is provided computer readable recording medium having embodied thereon a program for executing the method of dividing a low resolution image frame into a plurality of blocks having predetermined sizes; performing motion prediction in a unit of sub-pixel on the divided block and determining a motion vector in the unit of sub-pixel; dividing the motion vector of the sub-pixel unit into a first motion vector having an integer pixel unit and a second motion vector having a sub-pixel unit; determining at least one low resolution reference block corresponding to the divided block by using the first motion vector having the integer pixel unit; converting the divided block into high resolution block by using the second motion vector having the sub-pixel unit and the at least one low resolution reference block; and generating a high resolution image frame by using each of the converted high resolution blocks.

BRIEF DESCRIPTION OF THE DRAWINGS

The above and/or other aspects will become more apparent by describing in detail exemplary embodiments thereof with reference to the attached drawings in which:

FIG. 9 is a flowchart illustrating a process of renewing a high resolution block, according to an exemplary embodiment; and FIG. 10 is a flowchart illustrating a method of converting a resolution of a block based image, according to an exemplary embodiment.

DETAILED DESCRIPTION OF EXEMPLARY EMBODIMENTS

Figure 1:
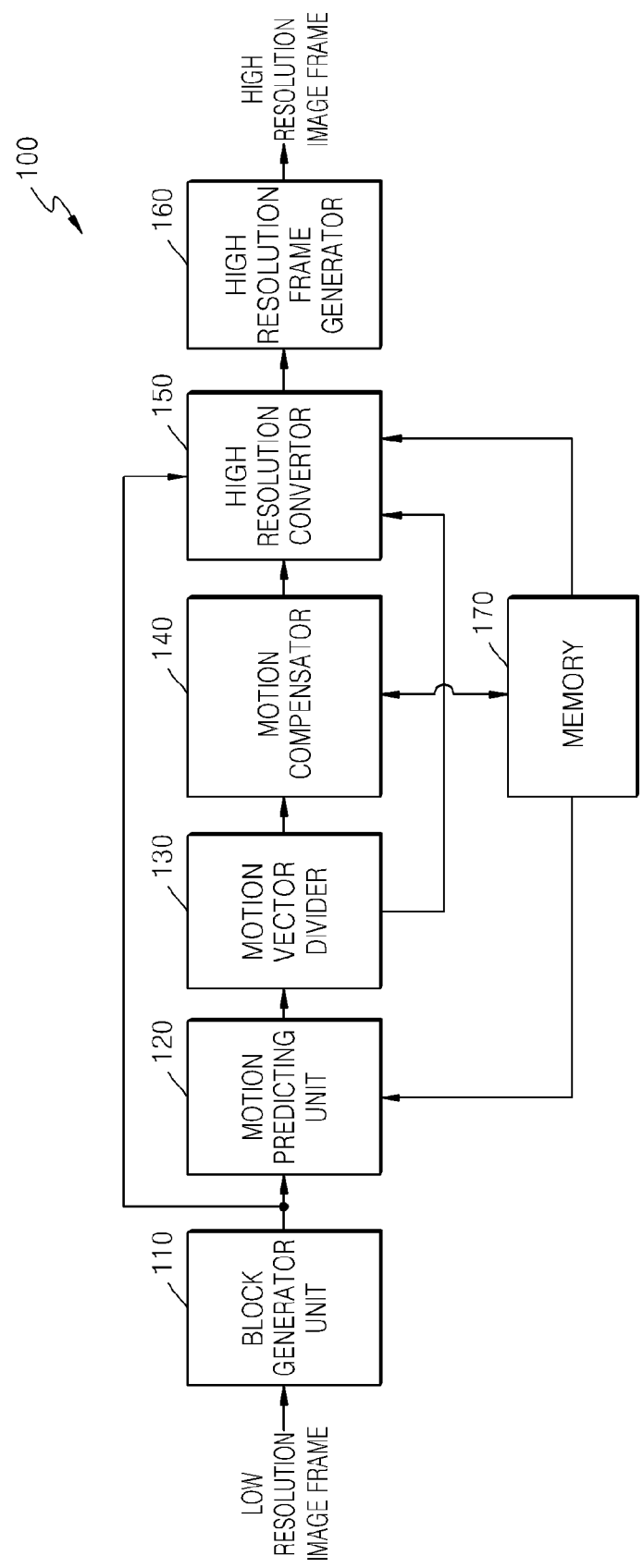
FIG. 1 is a block diagram illustrating an apparatus for converting a resolution of a block based image, according to an exemplary embodiment.

Hereinafter, exemplary embodiments will be described in greater detail with reference to the accompanying drawings.

As used herein, expressions such as "at least one of," when preceding a list of elements, modify the entire list of elements and do not modify the individual elements of the list.

Spatial interpolation may be performed to obtain a high resolution image frame from a single low resolution image frame. For example, the high resolution image frame may be generated by performing spatial interpolation on the single low resolution image frame by using bi-linear filtering, bi-cubic filtering, and poly-phase filtering. However, if spatial interpolation is performed by using a single image frame, a blurry image is easily generated. For example, bi-linear filtering generates a new pixel by using a mean value between two adjacent pixels. A filter using the mean value exhibits characteristics of a low-pass filter and thus a blurry quality high resolution image frame is generated.

Super-resolution processing is used for image processing such as forensic image processing, surveillance image processing, satellite image processing, etc., and generates a high resolution image frame from a plurality of low resolution image frames through image processing. Information obtained from the plurality of low resolution image frames is used to generate the high resolution image frame. If the plurality of low resolution image frames is used, since detailed information unavailable in a single image frame may be obtained, a higher quality high resolution image frame may be generated.

More specifically, the super-resolution processing may be induced from an image deterioration model as shown in Equation 1 below.

$$y_i = Hx + n_i \quad \text{[Equation 1]}$$

In Equation 1, i (i is an integer greater than or equal to 0) denotes a frame index indicating an image frame, yi denotes one of a plurality of low resolution images having an already known or obtained $i^{th}$ index, and x denotes a high resolution image frame to be finally generated through super-resolution processing. $n_i$ denotes a randomly added noise component. H denotes a loss rate of a spatial resolution of a high resolution image x, and may be modeled in an equation like $H=D_iB_iW_i$. $D_i$ denotes a resolution reduction operator from a high resolution image to a low resolution image, and is a down-sampling operator. $B_i$ denotes a blurring degree of an image, and may be a point spread function. The point spread function may be a Gaussian function. $W_i$ denotes a conversion degree of the same scene converted from a high resolution image to a low resolution image, and may be motion vector information or rotational information. Referring to Equation 1, an observed sequence of low resolution image frames of a scene is obtained by converting the high resolution image frame x into a low resolution image frame according to the loss rate of the spatial resolution as expressed in H, and by adding the randomly noise component to the converted low resolution image frame. According to an exemplary embodiment, a high resolution block corresponding to a low resolution block is generated by renewing the high resolution block based on a difference value between low resolution reference blocks in block units and low resolution blocks obtained from estimated high resolution blocks.

FIG. 1 is a block diagram illustrating an apparatus 100 for converting a resolution of a block based image, according to an exemplary embodiment.

Referring to FIG. 1, the apparatus 100 for converting the resolution of the block based image includes a block generator 110, a motion predictor 120, a motion vector divider 130, a motion compensator 140, a high resolution convertor 150, a high resolution frame generator 160, and a memory 170.

The block generator 110 divides an input low resolution image frame into blocks each having a predetermined size. In this regard, the size of blocks may be determined according to a block size used by the motion predictor 120. For example, the block generator 110 may divide the input low resolution image frame in a macro-block unit.

The motion predictor 120 performs motion prediction on the respective separated blocks at sub-pixel unit accuracy. More specifically, the motion predictor 120 interpolates a reference image frame in a sub-pixel unit, such as a ½ pixel, a ¼ pixel, a ⅛ pixel, etc. by using various spatial interpolation methods, determines a reference block most similar to a current block whose motion is predicted by using the interpolated reference image frame, and outputs a motion vector having sub-pixel unit accuracy based on a location difference value between the current block and the reference block.

The motion vector divider 130 divides the motion vector having sub-pixel unit accuracy into a motion vector of an integer pixel unit and a motion vector of the sub-pixel unit. In this regard, the motion vector divider 130 may determine the motion vector of the integer pixel unit in such a way that the motion vector of the sub-pixel unit has a positive value less than 1 pixel since, as will be described below, the motion vector of the sub-pixel unit that expands according to an extension rate of a high resolution image frame may have the sub-pixel unit less than 1 pixel in order to minimize an overlapping degree between blocks and reduce an amount of data that needs to be stored for super-resolution processing. For example, provided that the current block has a motion vector (−4.25, 0.75) as a result of motion prediction at ¼ pixel accuracy performed by the motion predictor 120, the motion vector divider 130 may divide the motion vector into a motion vector (−5, 0) of the integer pixel unit and a motion vector (0.75, 0.75) of the sub-pixel unit. That is, the motion vector divider 130 determines the motion vector of the integer pixel unit having an integer value not greater than each component of a motion vector generated as a result of motion prediction performed on the current block, and subtracts a motion vector component of the integer pixel unit from an original motion vector component, and thus the motion vector of the sub-pixel unit may be determined.

The motion compensator 140 performs motion compensation to read low resolution reference block data corresponding to the current block by using the determined motion vector of the integer pixel unit.

The high resolution convertor 150 converts the current block into a high, resolution block by using the motion vector of the sub-pixel unit and data of the current block and the reference block. A detailed operation of generating the high resolution block will be described below.

The high resolution frame generator 160 reconfigures each high resolution block converted by the high resolution-convertor 150 and generates a high resolution image frame.

The memory 170 stores image data used for motion prediction and compensation processes or super-resolution processing performed by the high resolution convertor 150. According to an exemplary embodiment, since image data in block units is used, a small capacity and high speed SRAM may be used as the memory 170. Additionally, it is noted that the location of the memory 170, is not limited to that shown in FIG. 1, but may be packaged into another module, for example, the high resolution convertor 150.

A detailed operation of an apparatus for converting a resolution of a block based image, according to an exemplary embodiment will now be described below.

Figure 3:
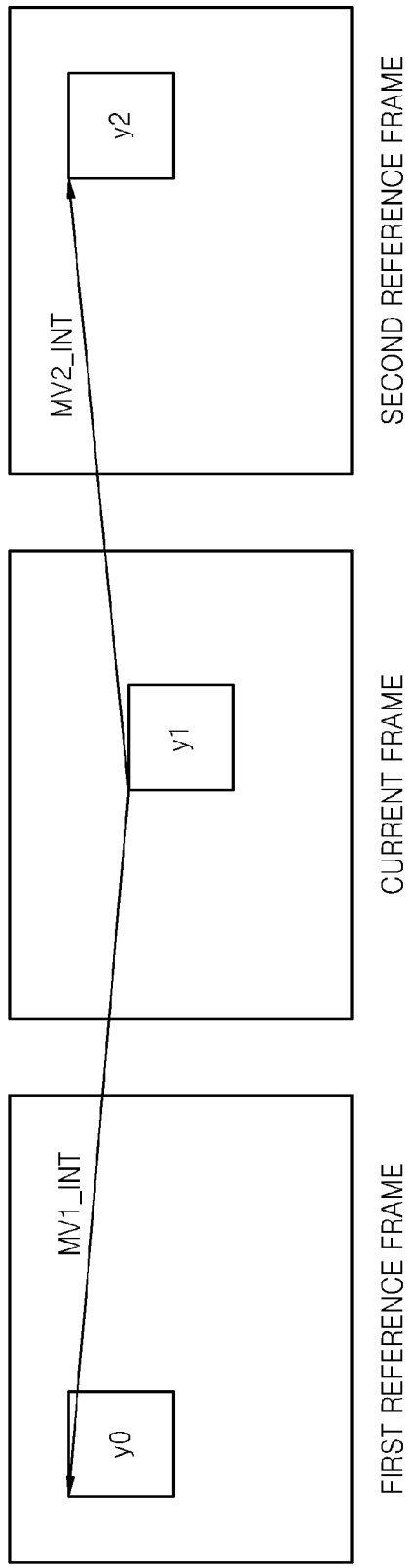
FIG. 3 is a reference view for explaining a process of determining a reference block used to convert a resolution of a low resolution image frame, according to an exemplary embodiment.

FIG. 3 is a reference view for explaining a process of determining a reference block used to convert a resolution of a low resolution image frame, according to an exemplary embodiment.

Referring to FIGS. 1 and 3, the motion predictor 120 performs motion prediction of sub-pixel accuracy on a current block y1 of a current frame and determines a motion vector of the current block y1. The motion compensator 140 reads low resolution reference block data corresponding to the current block y1 by using the determined motion vector of an integer pixel unit. For example, if the motion predictor 120 performs bi-directional motion prediction on the current block y1 and determines a motion vector MV1 indicating a reference block of a first reference frame and a motion vector MV2 indicating a reference block of a second reference frame, the motion vector divider 130 divides the motion vector MV1 into a motion vector MV1_INT of the integer pixel unit and a motion vector MV1_SUB of a sub-pixel unit, and divides the motion vector MV2 into a motion vector MV2_INT of the integer pixel unit and a motion vector MV2_SUB of the sub-pixel unit. The motion compensator 140 determines a first reference block y0 of the first reference frame indicated by the motion vector MV1_INT of the integer pixel unit and a second reference block y2 of the second reference frame indicated by the motion vector MV2_INT of the integer pixel unit. Information regarding the determined first and second reference blocks y0 and y2 and the current block y1 is input to the high resolution convertor 150. Although two reference blocks, y0 and y2, are used in FIG. 3, a method and apparatus for converging a resolution of a block based image according to an exemplary embodiment is not limited thereto, and other number of blocks may be used.

The high resolution convertor 150 generates a high resolution block corresponding to the current block y0 by using the motion vector MV1_SUB and MV2_SUB of the sub-pixel unit and the information regarding the current block y1 and the first and second reference blocks y0 and y2. More specifically, the high resolution convertor 150 repeatedly performs a process of renewing an initially estimated high resolution block trough an iterative operation process based on Equation 2 below.

$$x_{n+1} = x_n + \alpha \sum_i \{W_i^{-1} B_r U(DBW_i x_n - y_i)\} \quad \text{[Equation 2]}$$

In Equation 2, n (n is an integer) denotes an index of the iterative operation process, $\alpha$ denotes a predetermined weight, U denotes an up-sampling operator, D denotes a down-sampling operator, and $W_i$ denotes a motion vector determined by using a motion vector of a sub-pixel unit according to an extension rate from a low resolution to a high resolution. For example, if the motion vector divider 130 determines a motion vector (0.75, 0.75) of a sub-pixel unit, a current block y1 is a 16×16 macro-block, and a 64×64 high resolution block corresponding to the current block y1 is to be generated, $W_i$ is a value obtained by increasing the motion vector (0.75, 0.75) of the sub-pixel unit by the extension rate of 4 from the low resolution to the high resolution. In the example described above, $W_i$ may be a motion vector having a value (0.75*4, 0.75*4). $W_i^{-1}$ denotes an inverse motion vector of $W_i$ and is –(a, b), for example, if $W_i$ is (a, b). A point spread function may be a Gaussian function. i (i is an integer greater than or equal to 0) denotes a reference frame index indicating a reference frame, and yi denotes one of a plurality of reference blocks having an $i^{th}$ index obtained by the motion compensator 140 of FIG. 1. Xn+1 denotes a block obtained by renewing a high resolution block Xn generated through an n number of iterative operation processes.

Figure 7:
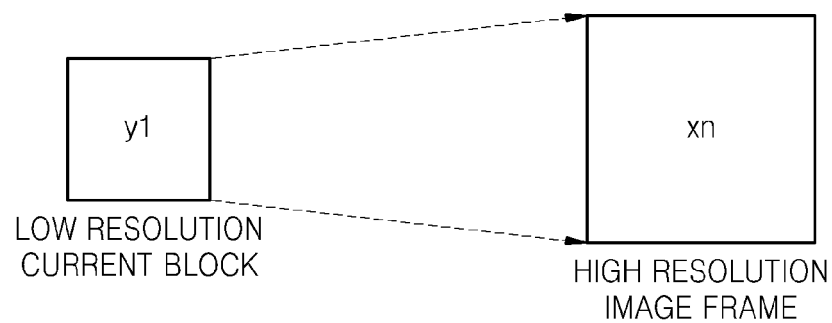
FIG. 7 is a reference view illustrating a low resolution current block to be converted into a high resolution block and a high resolution current block generated through an n number of iterative processes, according to an exemplary embodiment.

In Equation 2 above, the high resolution convertor 150 firstly generates a certain high resolution block X0. The high resolution convertor 150, as expressed in $DBW_i Xn$ of Equation 2, displaces the certain generated high resolution block X0 by the motion vector $W_i$ determined by using the motion vector of the sub-pixel unit, generates a displaced high resolution block, performs blurring and down-sampling on the displaced high resolution block, and generates a low resolution block. That is, $DBW_i X0$ is a low resolution block obtained by converting the initially estimated high resolution block X0 into low resolution. The high resolution convertor 150 calculates a difference value ($DBW_i X0-yi$) between the low resolution block $DBW_i X0$ converted from the initially estimated high resolution block X0 and the reference block yi. The difference value is converted into a high resolution region through up-sampling, inverse blurring, and inverse medication processes as expressed in $W_i^{-1} B_r U$ of Equation 2 above, and is used to generate a block X1 renewed from the Initially estimated high resolution block X0. The process of calculating the difference value may use a difference value that is calculated and summed using available all reference blocks to renew the initially estimated high resolution block. Similarly to the process of calculating the block X1 from the initially estimated high resolution block X0, the high resolution convertor 150 may generate a high resolution block X2 that is renewed two times from the one time renewed high resolution block X1 based on Equation 2. Such iterative process may be repeatedly performed until the high resolution block Xn is converged or the difference value ($DBW_i X0-yi$) is less than a predetermined threshold. By performing the above process, the high resolution block Xn is finally determined as a high resolution block corresponding to a current block as shown in FIG. 7.

Figure 4:
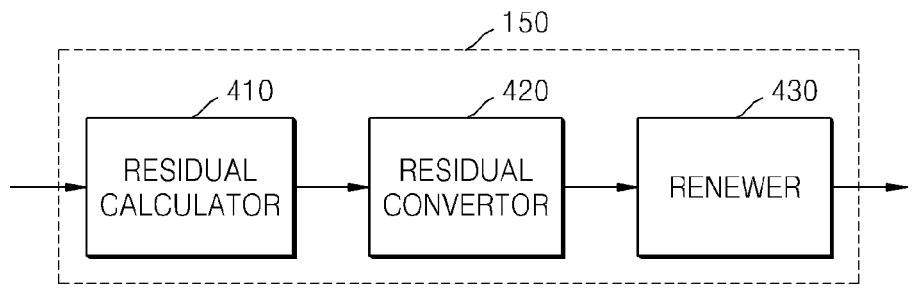
FIG. 4 is a detailed block diagram illustrating a high resolution convertor of FIG. 1.

FIG. 4 is a detailed block diagram illustrating the high resolution convertor 150 of FIG. 1.

Referring to FIG. 4, a residual calculator 410 generates a high resolution block corresponding to a low resolution current block to be converted into the high resolution block, converts the high resolution block displaced by using a motion vector of a sub-pixel unit into the low resolution block through down-sampling, and calculates a difference value between the converted low resolution block and reference blocks. That is, the residual calculator 410 calculates the difference value expressed as ($DBW_i x_n-y_i$) in Equation 2 above.

A residual convertor 420 converts the difference value between the converted low resolution block and reference blocks into a high resolution difference value. That is, the residual convertor 420 performs up-sampling, inverse sampling, and inverse displacement on ($DBW_i x_n-y_i$) calculated by the residual calculator 410 and performs an operation process $\{W_i^{-1} B_r U(DBW_i x_n-y_i)\}$.

A renewer 430 renews the high resolution block by using the converted high resolution difference value. As described above, such renewal process may be repeatedly performed until the difference value is less than a predetermined threshold.

Figure 5:
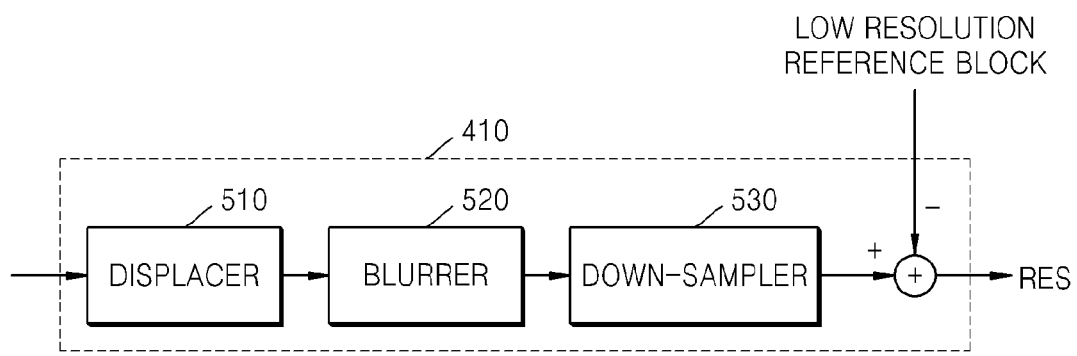
FIG. 5 is a detailed block diagram illustrating a residual calculator of FIG. 4.

FIG. 5 is a detailed block diagram illustrating the residual calculator 410 of FIG. 4.

Referring to FIG. 5, the residual calculator 410 includes a displacer 510, a blurrer 520, a down-sampler 530, and a subtractor 540.

Figure 8:
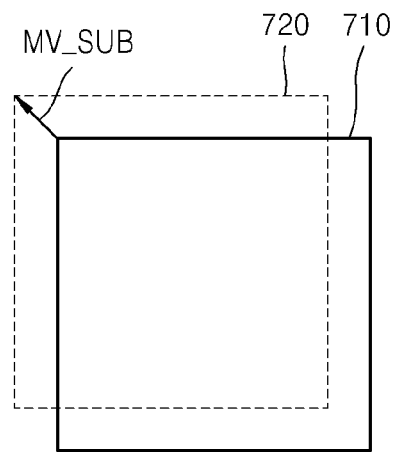
FIG. 8 is a reference view for explaining a process of generating a displacement high resolution block by displacing a high resolution block by using a motion vector in the unit of a sub-pixel, according to an exemplary embodiment.

The displacer 510 displaces a high resolution block by using a motion vector of a sub-pixel unit and generates a displacement high resolution block. In FIG. 8, provided that reference numeral 710 denotes the high resolution block Xn generated through an n number of renewal processes, the displacer 510 displaces the high resolution block Xn 710 by the motion vector $W_i$ determined by using a motion vector MV_SUB of the sub-pixel unit and generates a displacement high resolution block 720.

The blurrer 520 is a module performing a blurring operation and may use a point spread function as a blurring operator. The point spread function may be a Gaussian function. The blurrer 520 may be omitted.

The down-sampler 530 performs down-sampling on the displacement high resolution block 720 and converts the displacement high resolution block 720 into a low resolution block. The down-sampler 530 may be implemented through various filtering operations such as bi-cubic filtering or bi-linear filtering.

The subtractor 540 calculates and outputs a difference value RES between the low resolution block converted from the displacement high resolution block 720 and a low resolution reference block.

Figure 6:
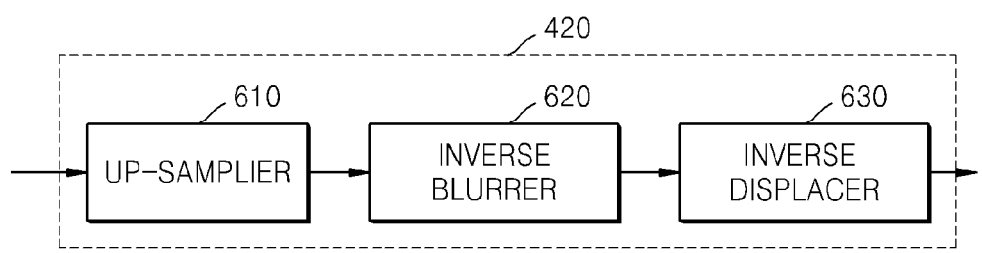
FIG. 6 is a detailed block diagram illustrating a residual convertor of FIG. 4.

FIG. 6 is a detailed block diagram illustrating the residual convertor 420 of FIG. 4.

Referring to FIG. 6, the residual convertor 420 includes an up-sampler 610, an inverse blurring unit 620, and an inverse displacer 630.

The up-sampler 610 converts a difference value between a low resolution block converted from a high resolution block and a low resolution reference block into a high resolution difference value. The down-sampler 530 may be implemented through various filtering operations such as bi-cubic filtering or bi-linear filtering.

The inverse blurring unit 620 is a module performing an inverse process of the blurring operation performed by the blurrer 520, and may be omitted.

The inverse displacer 630 displaces the up-sampled high resolution block by an inverse motion vector $W_i^{-1}$ of $W_i$.

Meanwhile, as described above, since up-sampling and down-sampling are repeatedly performed on a high resolution block through an iterative process when the high resolution block is generated according to an exemplary embodiment, the high resolution block Xn may use an extension block that extends to include neighboring pixels.

Figure 2:
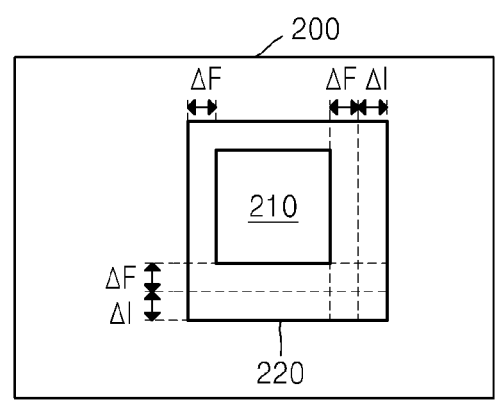
FIG. 2 is a reference view for explaining an extension block used to generate a high resolution block, according to an exemplary embodiment.

FIG. 2 is a reference view for explaining an extension block used to generate a high resolution block, according to an exemplary embodiment. As described above, the high resolution convertor 150 finally generates the high resolution block Xn obtained by extending a low resolution block by repeatedly performing a process of renewing an estimated high resolution block based on Equation 2. Since up-sampling and down-sampling are performed like U and D during an operation process based on Equation 2, the high resolution block 210 extends in all boundary directions by ΔF in consideration of a tap number of filters used to perform up-sampling and down-sampling on the high resolution block. If the tap number of filters is T, ΔF has a value {T/2}. For example, if a 4 tap bi-cubic filter is used, ΔF is 2, and if a 2 tap bi-linear filter is used, ΔF is 1.

Since the high resolution block 210 is displaced by a pre-determine size during displacement and inverse displacement processes, an extension block 220 obtained by additionally extending the high resolution block by ΔI may be used for high resolution conversion processing in consideration of the displacement and inverse displacement processes. According to an exemplary embodiment, since a motion vector of a sub-pixel unit for a displacement of the high resolution block always has a positive value, the high resolution block 210 needs to extend by ΔI with respect to some boundaries thereof. In FIG. 2, the high resolution block 210 additionally extends to the extension block 220 by ΔI provided that right and lower directions are positive directions of motion vectors of an x axial component and a y axial component. ΔI may be determined according to an extension rate from a low resolution block to a high resolution block. As described above, since a motion vector of a sub-pixel unit has accuracy of less than 1 pixel, when the extension rate is A, a motion vector used for displacement and inverse displacement processes can be displaced by a size of an A pixel as much as possible, and thus ΔI may be determined as the extension rate A. For example, if a current block is a 16×16 macro block, and a 64×64 high resolution block corresponding to the current block is generated, ΔI may have a value of the extension rate 4.

FIG. 9 is a flowchart illustrating a process of renewing a high resolution block, according to an exemplary embodiment.

Referring to FIG. 9, in operation 910, the high resolution convertor 150 generates an optional high resolution block corresponding to a low resolution current block to be converted into a high resolution block.

In operation 920, the high resolution convertor 150 converts the high resolution block displaced using a motion vector of a sub-pixel unit into a low resolution block through down-sampling, and calculates a difference value between the converted low resolution block and reference-blocks.

In operation 930, the high resolution convertor 150 converts the difference value between the low resolution block converted from the high resolution block and reference blocks into a high resolution difference value.

In operation 940, the high resolution convertor 150 renews the high resolution block by using the high resolution difference value. In operation 950, the high resolution convertor 150 repeatedly performs operations 920 through 940 until $(DBW_i x_n - y_i)$ calculated based on Equation 2 is converged or is less than a predetermined threshold, and thus a final high resolution block is determined.

FIG. 10 is a flowchart illustrating a method of converting a resolution of a block based image, according to an exemplary embodiment.

Referring to FIG. 10, in operation 1010, the block generator 110 divides a low resolution image frame into blocks having predetermined sizes.

In operation 1020, the motion predictor 120 performs motion prediction of a sub-pixel unit on each of the divided blocks and determines a motion vector of the sub-pixel unit.

In operation 1030, the motion vector divider 130 separates the motion vector of the sub-pixel unit into a first motion vector of an integer pixel unit and a second motion vector of the sub-pixel unit.

In operation 1040, the motion vector divider 130 determines at least one low resolution reference block corresponding to the blocks by using the first motion vector of the integer pixel unit.

In operation 1050, the high resolution convertor 150 converts the blocks into high resolution blocks by using the second motion vector of the sub-pixel unit and the at least one low resolution reference block.

In operation 1060, the high resolution frame generator 160 generates a high resolution image frame by using each of the converted high resolution blocks.

Due to hardware limitations, the conventional super-resolution processing uses a high capacity, relatively slow speed, and low cost DRAM in order to store a plurality of low resolution image frames and reduce cost. Further, a high capacity DRAM increases cost when coupled to a super-resolution processing module due to a limitation of a memory packaging technology and thus is implemented as a separate external memory from the conventional super-resolution processing module. According to an exemplary embodiment, super-resolution processing is not performed in a high capacity frame unit but is performed based on a block unit, and thus a low capacity, relatively high speed, and low cost SRAM coupled to a super-resolution processing module may be used as a storage memory.

Meanwhile, the foregoing exemplary embodiments may be created as programs which can be executed by computers and may be implemented in a general digital computer operating the programs by using a computer-readable recording medium. The computer-readable medium may include storage media such as magnetic storage media (e.g., a ROM, a floppy disk, a hard disk, or the like), optical reading media (e.g., a CD-ROM, a DVD, or the like).

While the inventive concept has been particularly shown and described with reference to exemplary embodiments thereof, it will be understood by one of ordinary skill in the art that various changes in form and details may be made therein without departing from the spirit and scope of the inventive concept as defined by the following claims. The exemplary embodiments should be considered in a descriptive sense only and not for purposes of limitation. Therefore, the scope of the inventive concept is defined not by the detailed description of the inventive concept but by the following claims, and all differences within the scope will be construed as being included in the present inventive concept.

What is claimed is:

1. A method of converting a resolution of a block-based image, the method comprising:
    dividing a low resolution image frame into a plurality of blocks having predetermined sizes;
    performing motion prediction on a sub-pixel unit of each one of the divided blocks and determining a motion vector of the sub-pixel unit;
    dividing the motion vector of the sub-pixel unit into a first motion vector having an integer pixel unit and a second motion vector having the sub-pixel unit;
    determining at least one low resolution reference block corresponding to each one of the divided blocks by using the first motion vector having the integer pixel unit;
    converting each one of the divided blocks into a high resolution block by using the second motion vector having the sub-pixel unit and the at least one low resolution reference block; and
    generating a high resolution image frame by using each one of the converted high resolution blocks,
    wherein at least one of the dividing the low resolution image, the performing the motion prediction, the dividing the motion vector, the determining the at least one low resolution reference block, the converting, and the generating the high resolution image frame is performed by a processor.

2. The method of claim 1, wherein the converting of each one of the divided blocks into the high resolution blocks comprises:
    generating a certain high resolution block with respect to the divided block;
    generating a difference value between a low resolution block obtained by converting the resolution of the high resolution block into low resolution and the at least one low resolution reference block;
    converting the difference value into a high resolution difference value; and
    renewing the high resolution block by using the high resolution difference value.

3. The method of claim 2, further comprising: repeatedly performing generating the difference value between the low resolution block obtained by converting the resolution of the high resolution block into low resolution and the at least one low resolution reference block; converting the difference value into the high resolution difference value; and renewing the high resolution block by using the high resolution difference value until the difference value is converged to or is less than a predetermined threshold by using the renewed high resolution block.

4. The method of claim 2, wherein the generating of the difference value comprises:
    generating a displacement high resolution block by displacing the high resolution block by using the second motion vector;
    performing down-sampling on the displacement high resolution block and converting the displacement high resolution block into a displacement low resolution block; and
    calculating a difference value between the converted displacement low resolution block and the at least one low resolution reference block.

5. The method of claim 4, wherein the converting of the displacement high resolution block into the displacement low resolution block further comprises: multiplying a point spread function to the displacement high resolution block.

6. The method of claim 5, wherein the point spread function is a Gaussian function.

7. The method of claim 2, wherein the converting of the difference value comprises:
    performing up-sampling on the difference value; and
    inversely-displacing the up-sampled difference value by using the second motion vector.

8. The method of claim 1, wherein the converting of each one of the divided blocks into the high resolution blocks comprises: using an extension block extending such that each of the high resolution blocks includes neighboring pixels when the block is converted into the high resolution block.

9. The method of claim 8, wherein an extension width of the extension block is determined according to a tap number of a filter used to convert the divided block into the high resolution block and an extension ratio of the low resolution block to the high resolution block.

10. A non-transitory computer readable recording medium having embodied thereon a program for executing the method of claim 1.

11. An apparatus for converting a resolution of a block-based image, the apparatus comprising:
    a motion predictor which performs motion prediction in a sub-pixel unit on each of blocks having predetermined sizes divided from a low resolution image frame and determining a motion vector in the sub-pixel unit;
    a motion vector divider which divides the motion vector in the sub-pixel unit into a first motion vector having an integer pixel unit and a second motion vector having the sub-pixel unit;

a motion compensator which determines at least one low resolution reference block corresponding to each of the divided blocks by using the first motion vector having the integer pixel unit;

a high resolution convertor which converts each of the divided blocks into high resolution blocks by using the second motion vector having the sub-pixel unit and the at least one low resolution reference block; and a high resolution frame generator which generates a high resolution image frame by using each of the high resolution blocks.

12. The apparatus of claim 11, wherein the high resolution convertor comprises:

a residual calculator which generates a certain high resolution block with respect to each of the blocks, and generates a difference value between a low resolution block obtained by converting the resolution of the high resolution block into low resolution and the at least one low resolution reference block;

a residual convertor which converts the difference value into a high resolution difference value; and a renewing unit which renews the high resolution block by using the high resolution difference value.

13. The apparatus of claim 12, wherein the high resolution convertor repeatedly performs calculation of the difference value and renewal of the high resolution block until the difference value is converged to or is less than a predetermined threshold by using the renewed high resolution block.

14. The apparatus of claim 12, wherein the residual calculator comprises:

a displacer which generates a displacement high resolution block by displacing the high resolution block by using the second motion vector;

a down-sampler which performs down-sampling on the displacement high resolution block and converts the displacement high resolution block into a displacement low resolution block; and a subtractor which calculates a difference value between the converted displacement low resolution block and the at least one low resolution reference block.

15. The apparatus of claim 14, wherein the residual calculator further comprises: a blurring unit which multiplies a point spread function to the displacement high resolution block.

16. The apparatus of claim 15, wherein the point spread function is a Gaussian function.

17. The apparatus of claim 12, wherein the residual convertor comprises:

an up-sampler which performs up-sampling on the difference value; and an inverse displacer which performs displacing the up-sampled difference value by using the second motion vector.

18. The apparatus of claim 11, wherein the high resolution convertor uses an extension block in which extends such that the high resolution block includes neighboring pixels when converting the divided block into the high resolution block.

19. The apparatus of claim 18, wherein an extension width of the extension block is determined according to a tap number of a filter used to convert the divided block into the high resolution block and an extension ratio of the low resolution block and the high resolution block.

20. An apparatus for converting a resolution of a block-based image, the apparatus comprising:

a block generator which divides an input low resolution image frame into blocks, each block having a predetermined size;

a motion predictor which performs motion prediction on each of the divided blocks, determines a reference block most similar to a current block of the divided blocks, and outputs a motion vector for the current block;

a motion vector divider which divides the motion vector into a motion vector of an integer pixel unit and a motion vector of a sub-pixel unit;

a motion compensator which reads low resolution reference block data corresponding to the current block using the motion vector of the integer pixel unit;

a high resolution convertor which converts the current block into a high resolution block using the motion vector of the sub-pixel unit and data of the current block and the reference block;

a high resolution frame generator which reconfigures the high resolution block and generates a high resolution image frame using each of the converted high resolution blocks.

* * * * *